June 3, 1941.  K. BAUER  2,244,603

GYROSCOPIC APPARATUS

Filed June 11, 1937

Inventor:
Karl Bauer

Patented June 3, 1941

2,244,603

UNITED STATES PATENT OFFICE 2,244,603

GYROSCOPIC APPARATUS

Karl Bauer, Berlin-Lichterfelde, Germany

Application June 11, 1937, Serial No. 147,773
In Germany July 16, 1936

2 Claims. (Cl. 74—5)

This invention relates to improvements in gyroscopic apparatus, especially designed for use in aircraft.

It is an object of this invention to provide a gyroscopic instrument that will give perfect performance under great temperature changes.

It is a further object of this invention to reduce the weight and to simplify the construction of gyroscopic instruments more particularly designed for use as directional gyroscopes, artificial horizons, and turn indicators for aircraft.

As far as I am aware, various ways have been proposed to compensate gyroscopic instruments against temperature changes that will affect the freedom of the bearings. It has been proposed to employ steel rotor shafts rotatably supported by steel frames or to use composite frames having steel parts extending parallel to the rotor shaft. It has further been suggested to employ temperature compensated bearings consisting of relatively complicated movable parts which under influence of the temperature change their relative position as to maintain the freedom of the bearings undisturbed.

According to the invention I employ in a gyroscopic instrument a rotor bearing member formed of aluminum alloy in one part and a rotor having a shaft made of aluminum alloy, thus avoiding substantial differences in thermal expansion and contraction of the parts and further resulting in an instrument of simple construction and greatly reduced weight.

Aims, objects and advantages of this invention will appear from a consideration of the description which follows with the accompanying drawing showing embodiments of this invention for illustrative purposes. It is to be understood, however, that the description is not to be taken in a limiting sense, the scope of this invention being defined in the appended claims.

Referring to the drawings.

Figure 1:
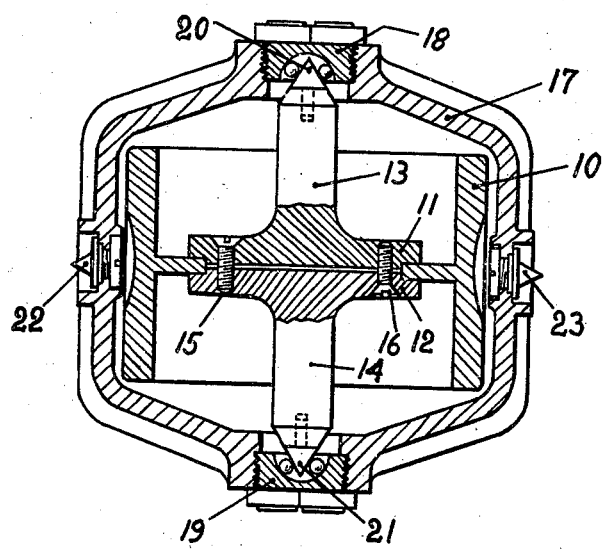
Fig. 1 is a sectional view of gyro rotor and rotor bearing ring.

The gyro instrument shown in Fig. 1 includes a heavy-metal rim 10 secured to flanges 11 and 12 of a two-piece rotor shaft 13 and 14 of a light metal, i. e., aluminum alloy or such like. The flanges 11 and 12 may be held together by any suitable means, in the illustration screws 15 and 16 being shown for that purpose. The shaft is rotatably supported by a rotor bearing member or ring 17, also of aluminum alloy, in anti-friction bearings 18 and 19, preferably ball bearings of hardened steel. For this purpose the tapered ends of the rotor axis of the illustrated example are provided with bearing cones 20 and 21 secured thereto in any suitable manner. The rotor bearing member is shown as provided with pivots 22, 23 for rotatably mounting the same in a suitable support (not shown).

A rotor shaft of relatively great length as compared to the length of the steel bearings may be made of aluminum alloy having exactly the same composition as that of the rotor bearing member. Often, however, it may be advantageous, especially in instruments in which the rotor shaft is relatively short or in instruments of greatest accuracy, to compensate for the expansion and contraction of the steel bearings by choosing for the rotor bearing member and the shaft light alloys having different thermal coefficients of expansion. It may, for example, be advantageous to make the shaft of a metal having a smaller coefficient of expansion than the rotor bearing member to allow a greater freedom due to greater viscosity of lubricants in low temperatures.

It is easily seen that a gyroscopic apparatus according to the invention will have a greatly reduced weight besides being of simple construction. All parts, except the bearings and the rim of the rotor may be made of aluminum alloy, and even the heavy-metal rim can be dispensed with in some types of instruments in which only a small gyroscopic force is required, such as turn indicators.

Figure 2:
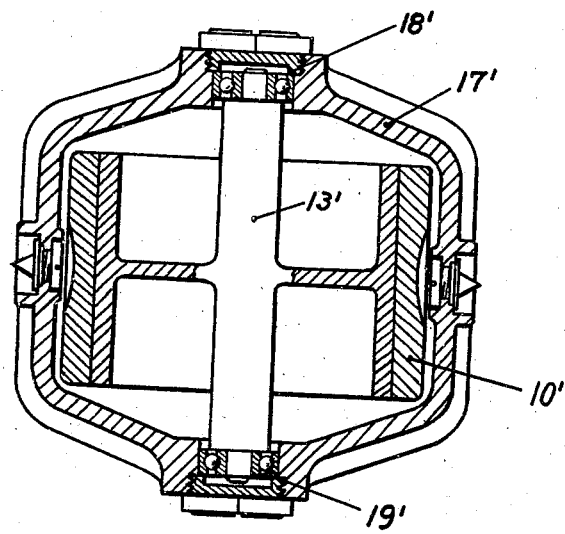
Fig. 2 shows a modified form the invention may assume.

A modified form of the invention is shown in Fig. 2. The rotor shaft 13' in this example is made of one piece and provided with a heavy metal rim 10', if it is desired to increase the inertia of the spinning mass. Conventional ball bearings 18' and 19' are shown in this example. It is easily seen, that the total expansion of the rotor shaft plus the expansion of the bearings must be matched by the expansion of the rotor bearing member 17' against which the roller bearings bear.

Obviously, the present invention is not restricted to the particular embodiments herein shown and described. Moreover it is not indispensable that all the features of this invention be used conjointly, since they may advantageously be employed in various combinations and subcombinations.

What is claimed is:

1. In a gyroscopic apparatus the combination of a rotor bearing member formed of aluminum alloy in one part; a heavy-metal rotor rim having an inward spoke-rib; a rotor shaft made of aluminum alloy comprising two substantially cylindrical shafts having flanged ends adapted to receive the spoke-rib between them; means for fastening the flanged ends of the rotor shaft together; and hard-metal bearings for rotatably supporting said shaft in said member.

2. In a gyroscopic apparatus the combination of a rotor bearing member formed of alumnium alloy in one part; a rotor wheel made of aluminum alloy and a shaft integral therewith; a heavy-metal rim secured to said wheel; and bearings of hardened steel for rotatably supporting said shaft in said member.

KARL BAUER.